Oct. 30, 1934.    I. ROSENBERG    1,979,232
METHOD OF RECOVERING SO₂ USED IN REFINING MINERAL OILS
Filed July 24, 1931
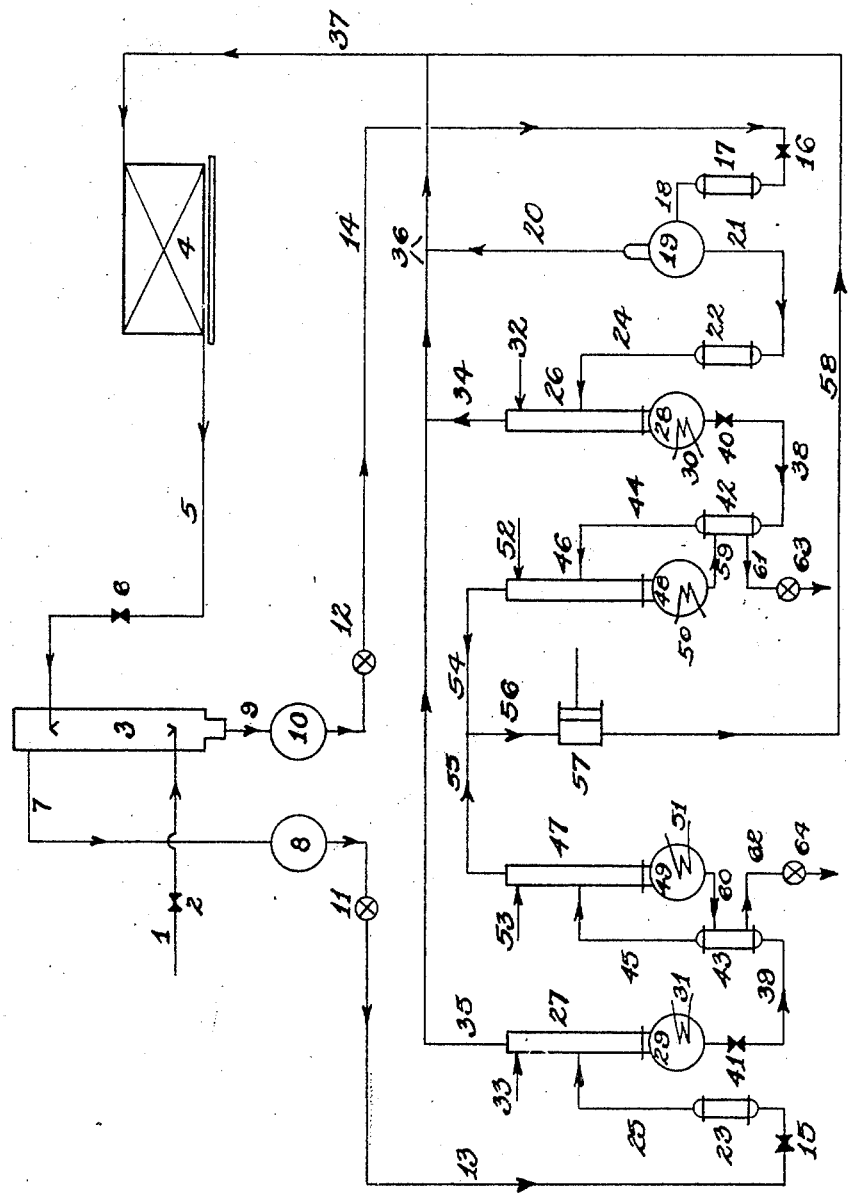
INVENTOR.
*Ignaz Rosenberg*
By *Evans, Booth, Varney & Holcombe*
ATTORNEYS.

Patented Oct. 30, 1934

1,979,232

UNITED STATES PATENT OFFICE 1,979,232

METHOD OF RECOVERING SO₂ USED IN REFINING MINERAL OILS

Ignaz Rosenberg, Berlin, Germany, assignor to the firm Edeleanu Gesellschaft m. b. H., Berlin, Germany, a German company Application July 24, 1931, Serial No. 552,958
In Germany July 25, 1930

1 Claim. (Cl. 196—37)

The objects of this invention are to provide for the separation of liquefied sulphur dioxide from the raffinate and extract obtained in the well known Edeleanu process of refining hydrocarbon oils by extraction with liquefied sulphur dioxide, and particularly to eliminate a good deal of mechanical means, such as vacuum pumps, by the substitution of thermal means, such as heating vessels.

Further objects are to remove the final traces of sulphur dioxide from the raffinate and extract without changing the chemical structure of the materials treated and to save the sulphur dioxide in form for re-use in the process.

Up until the present time the separation of sulphur dioxide from the raffinate and extract as obtained in the regular carrying-out of the Edeleanu process has been effected by simple evaporation of the sulphur dioxide in such a manner that pressure decrease and temperature increase take place in two or more steps.

The vapors leaving the evaporation units in obeying the laws governing distillation carry with them hydrocarbons to a greater or less degree. Other conditions remaining constant the hydrocarbon content of the vapors will be richer the lower the boiling points of the fractions comprising the extract and raffinate. If the boiling points of the hydrocarbons comprising the extract and raffinate are such that the sulphur dioxide vapors evolved in the evaporation operation contain only an extremely small percentage of hydrocarbons, then the regular operation of the Edeleanu system by simple evaporation is sufficient.

In other cases great quantities of hydrocarbon vapors may pass over with the sulphur dioxide vapor and so cause difficulty in the handling or operation of the rest of the recovery system. In such cases the proper use of rectification (which is known) has the advantage (when employed in connection with the Edeleanu process) of satisfactorily eliminating the hydrocarbon content from the sulphur dioxide vapor passing out of the system. If rectification be employed it is not necessary to pay special attention to the production of primary vapors low in hydrocarbons since a sharp separation may be effected later on. In this connection under certain conditions it is not necessary to work with pressure decrease in the individual evaporators for the purpose of expelling the sulphur dioxide, as the desired results may be obtained in these cases for instance only by increasing the temperature. This has the advantage that the desired degasification may be obtained without the use of mechanical arrangements (vacuum pumps, compressors, jet pumps etc.) merely by thermal procedure. But in any case it is possible to obtain a sufficient degasification by using rectification without being compelled to decrease the pressure considerably under the atmospheric pressure. In other words, the power machinery now in use for the Edeleanu process would be largely supplanted by heating devices at least to a great extent. Thus the desired minute residual sulphur dioxide content according to this improvement is not so much, as heretofore, obtained by decreasing pressures and the use of medium temperature, as by the use of higher pressures and higher temperatures.

In the following description the principles underlying my improved process are explained and the accompanying drawing represents an example of apparatus suitable for carrying-out the process according to the invention. Hereby it is supposed that the expelling of the sulphur dioxide takes place in two pressure stages, the sulphur dioxide vapors of the first pressure stage (condenser pressure stage) being led directly to the condenser, whilst those of the second pressure stage (atmospheric pressure stage) are sucked up and compressed to the pressure of the condenser by suitable machines.

The oil which is to be worked up after preliminary cooling in apparatus not shown on the sketch is caused to enter the mixer (3) from below by a supply tube (1). A valve (2) serves to control the quantity of oil introduced. The quantity of liquid sulphur dioxide for the treatment is conducted from the condenser (4) under the pressure prevailing therein through a tube (5) and a controlling valve (6) to the upper part of the mixer (3). The liquid SO₂ is previously cooled by suitable interchange of heat to the temperature required for the treatment. In mixer (3) nearly all unsaturated and aromatic hydrocarbons are dissolved by the liquid sulphur dioxide in well known manner and removed from the treated oil. The raffinate containing a small quantity of sulphur dioxide in solution is conducted through a pipe (7) into a storage tank (8), while the extract solution is caused to flow through a pipe (9) into a storage tank (10). The raffinate solution and extract solution are then withdrawn from the tanks (8) and (10) by means of pumps (11) and (12) and, after preheating by effective heat interchange within the apparatus, are introduced into the first stage of the evaporators through tubes (13) and (14) with controlling valves (15) and (16).

As mentioned above evaporation of the sulphur dioxide is effected in two pressure stages, one of them being not essentially higher than condenser pressure, the other having about atmospheric pressure. Evaporation takes place on the extract side as well as on the raffinate side in two evaporators provided with rectifying columns. On the extract side a third evaporator without rectifying column is suitably installed in which evaporation of the main part of the sulphur dioxide contained in the extract solution is effected.

The extract solution after having passed through tube (14) with controlling valve (16) flows through heating device (17) and pipe (18) into the evaporator (19). This evaporator is working at a pressure not substantially higher than the condenser pressure, while the temperature is relatively low, due to the fact that there is a high amount of sulphur dioxide in the incoming mixture. The sulphur dioxide gas leaves evaporator (19) by tube (20), while the extract solution is caused to flow through pipe (21) into the next evaporator. The following evaporating process is now the same on the raffinate side as on the extract side. The extract solution and the raffinate solution pass through heating devices (22) and (23) respectively and enter the rectifying columns (26) and (27) respectively of the evaporators (28) and (29) respectively by pipes (24) and (25) respectively. The pressure prevailing in these evaporators is the same as in evaporator (19) and normally amounts to about 50 to 90 lbs. depending on the temperature of the water available for cooling in the condenser (4), whereas the temperature, effected by means of heating coils (30) and (31) respectively is considerably higher than that in evaporator (19) and amounts to about 210° F., by which is meant the conventional temperature of treatment in the Edeleanu process, which may range from about 200 to 250° F. In the rectifying columns which may be filled with Raschig rings or equipped with baffle-plates the sulphur dioxide vapors mixed with hydrocarbons of low boiling point go upwards whilst fresh and suitably precooled sulphur dioxide liquid or cooled solutions of raffinate and extract respectively serving as reflux are caused to enter at the top of the columns by pipes (32) and (33) respectively and run down the counter-flow to the vapors. Thus condensation of the light hydrocarbons mixed with the sulphur dioxide vapors is effected so that the sulphur dioxide vapors are nearly entirely freed from these constituents. These vapors leave the columns (26) and (27) respectively by tubes (34) and (35) respectively and are led to the condenser (4) together with the vapors coming from evaporator (19) through pipes (36) and (37).

Both fractions, extract and raffinate, containing still a small amount of sulphur dioxide leave the condenser pressure evaporators (28) and (29) respectively by tubes (38) and (39) respectively pass through controlling valves (40) and (41) respectively, heat exchangers (42) and (43) respectively, and tubes (44) and (45) respectively to the rectifying columns (46) and (47) of the evaporators (48) and (49) respectively, entering in the middle of them. At the top of the columns (46) and (47) reflux of sulphur dioxide liquid or of extract—and raffinate—solution respectively is provided in the same manner as at columns (32) and (33). These reflux liquids enter by tubes (52) and (53) respectively.

In the evaporators (48) and (49) about atmospheric pressure is maintained by means of one or more compressors (57) which suck off the sulphur dioxide gases from the columns by tubes (54), (55) and (56), and compress and lead them through tube (58) into tube (37) which is leading to the condenser (4). The temperature in these so-called "atmospheric-pressure-evaporators" is maintained at about 300° F. which temperature is effected by the heating coils (50) and (51) installed in the evaporators (48) and (49) respectively. Under the influence of the reduced pressure and especially of the raised temperature the fractions of extract and raffinate now are freed from sulphur dioxide. They leave the evaporators (48) and (49) through pipes (59) and (60) respectively; flow in counter-current with the incoming solutions through heat exchangers (42) and (43) respectively and are led by pipes (61) and (62) respectively to pumps (63) and (64) respectively which feed them to storage tanks for finished products.

*Example*

A kerosene with an initial boiling point of 390° F. and an end point of 530° F. was treated with 100% sulphur dioxide (in volume) the yield in extract amounting to 15%. By heating up the sulphur dioxide solutions of raffinate and extract in the above described evaporators rising temperatures in the last stage of the raffinate side up to 300° F. and on the extract side up to 260° F., both fractions were freed from sulphur dioxide. The resulting finished raffinate had a sulphur dioxide content of 0.04%, the finished extract a content of 0.08% sulphur dioxide.

I claim:

In the process of refining mineral oils by extraction with liquid-$SO_2$, the method of substantially freeing the raffinate and extract of liquid-$SO_2$ and recovering the latter for reuse, comprising continuously passing said raffinate and extract through respective evaporation systems each of which consists of a first stage at condenser-pressure maintained at a temperature of about from 200° F. to 250° F., and a second stage at atmospheric-pressure maintained at a temperature of the order of 300° F., the extract first stage being preceded by a preliminary stage at condenser-pressure maintained at a lower temperature insufficient to cause appreciable evolution of oil vapors, passing the vapors from said first and second stages through respective rectification zones associated therewith to secure the recovery of substantially oil-free $SO_2$ vapors from each stage, liquid-$SO_2$ being employed as an end reflux medium and the feeds to the respective first and second stages being employed as intermediate reflux media in the respective rectification zones associated therewith, uniting the $SO_2$ vapors from the atmospheric-pressure stages, compressing them to condenser-pressure and uniting them with the $SO_2$ vapors from the condenser-pressure stages, and condensing the combined $SO_2$ vapors.

IGNAZ ROSENBERG.